United States Patent
Cho et al.

(10) Patent No.: US 7,537,855 B2
(45) Date of Patent: May 26, 2009

(54) UNIT CELL STRUCTURE COMPRISING COMPOSITE-GASKET FOR FUEL CELL STACK

(75) Inventors: Kyu Taek Cho, Gwangmyeong-si (KR); Tae Won Lim, Seoul (KR); Ki Chun Lee, Seongnam-si (KR); Soo Whan Kim, Seongnam-si (KR); Jong Hyun Lee, Seongnam-si (KR); Su Hyun Choi, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 732 days.

(21) Appl. No.: 11/028,285

(22) Filed: Dec. 30, 2004

(65) Prior Publication Data

US 2005/0214620 A1 Sep. 29, 2005

(30) Foreign Application Priority Data

Mar. 27, 2004 (KR) .................... 10-2004-0021001

(51) Int. Cl.
*H01M 8/02* (2006.01)
*H01M 8/10* (2006.01)
(52) U.S. Cl. .................................... 429/35
(58) Field of Classification Search ........... 429/35, 429/34
See application file for complete search history.

(56) References Cited

U.S. PATENT DOCUMENTS

| 6,656,625 | B1 * | 12/2003 | Thompson et al. | 429/36 |
| 6,761,991 | B2 * | 7/2004 | Frisch et al. | 429/35 |
| 2002/0110721 | A1 * | 8/2002 | Hatano et al. | 429/36 |
| 2003/0027031 | A1 * | 2/2003 | Baldauf et al. | 429/35 |
| 2003/0215690 | A1 * | 11/2003 | Wald et al. | 429/35 |

FOREIGN PATENT DOCUMENTS

JP 2003056704 A * 2/2003

OTHER PUBLICATIONS

IPDL Machine Translation of JP 2003-056704A.*
Definition of Align From the Free Dictionary http://www.thefreedictionary.com/align.*
Definition of Align From Dictionary.Reference http://dictionary.reference.com/browse/aligned.*

* cited by examiner

*Primary Examiner*—Gregg Cantelmo
(74) *Attorney, Agent, or Firm*—Morgan, Lewis & Bockius LLP

(57) ABSTRACT

A composite gasket for fuel cell stack comprises two rows of beads and a support which can improve mountability and sealing property and reduce the assembly pressure by using materials having low hardness with reduced volume. This invention also relates to a structure for the assembly of the composite gasket.

3 Claims, 4 Drawing Sheets

UNIT CELL STRUCTURE COMPRISING COMPOSITE-GASKET FOR FUEL CELL STACK

CROSS REFERENCE TO RELATED APPLICATIONS

This application claims the benefit of Korean Application No. 2004-0021001 filed on Mar. 27, 2004, which is incorporated by reference herein in its entirety.

FIELD OF THE INVENTION

This invention relates to a composite gasket for fuel a cell stack.

BACKGROUND OF THE INVENTION

A proton exchange membrane fuel cell (PEMFC) stack, which is widely used in automobiles and mobile phones, has a special structure in that a membrane and electrode assembly (MEA) is inserted in between a proton electrode and an oxygen electrode. This structure is repeated to eventually obtain a layered structure.

The number of separator plates and MEAs directly relates to the function of a fuel cell and it varies greatly depending on the output required. In particular, the PEMFC stack can have up to a few hundred of such structures. Therefore, the gasket that is installed two per each separator plate should be easily mounted so that the separator and MEA can be assembled efficiently. Further, it is desirable that the gasket be lightweight with low volume to maintain the pressure at the time of assembly to the minimum level. In addition, the gasket is required to be able to prevent impurities from entering the internal space of the stack while preventing the mutual introduction between a fuel gas and a coolant n the manifold.

In general, a PEMFC stack may comprise two separator plates having electric conductivity, where each of which comprises an oxygen electrode and a hydrogen electrode on either side, and an MEA, which generates electricity by passing protons through it. The PEMFC stack is assembled so that each of the separator plates is disposed on either side of the MEA and each gasket is disposed in between MEA and each separator plate. These members require relatively higher output compared to that of series structure and thus it is requested that the gasket be manufactured with least volume and surface pressure.

Considering that a few hundred of separator plates and MEAs are assembled in a series-layered structure there is required an efficient method for installation. Gaskets used in unit cell for fuel cell stack are sealed because they are disposed in between a separator plate and MEA, but the difference in the rate of expansion and shrinkage results in change in MEA and the gasket. This results from repetition of expansion and shrinkage due to heat generated by the contact between the rubber gasket and MEA, which experiences frequent expansion and shrinkage because of change in temperature and humidity. As the gasket and MEA experience repetitive expansion and shrinkage due to heat, there occurs a capillary phenomenon through which a coolant migrates and then reacts with hydrogen and oxygen thereby deteriorating or destroying the functions of the fuel cell. Further, the outer boundaries of the separator plate, MEA, and gasket are not completely aligned and thus interfere with the flow of a gas. This leads to uneven supply of the gas thereby deteriorating the functions of the fuel cell.

In the conventional gasket where the cross-section is provided with one row of beads, there is generated microspace due to the difference in the rate of expansion and shrinkage of the MEA and gasket by heat. The microspace causes the capillary phenomenon which makes the coolant in the manifold enter the region of chemical reaction in the fuel cell thus contaminating the MEA and drastically reducing the functions of the fuel cell. Further, when the gasket moves in the groove of the separator plate, the gasket which is in dual contact with both surfaces of the MEA is dislocated thereby lowering surface pressure and sealing property.

Therefore, the gasket used in the conventional unit cell for fuel cell stack has disadvantages that ethylene glycol, which is used for preventing the increase in operating temperature of the separator plate, penetrates the interior of separator plates and also it requires much time for assembly because of its poor mountability.

SUMMARY OF THE INVENTION

One embodiment of the present invention includes a unit cell structure for fuel cell stack comprising an MEA, a separator plate located on both left and right sides of the MEA, respectively, and a gasket located between the MEA and each of the separator plates, respectively. The gasket structure may comprise a composite gasket provided with two rows of rubber beads, each row of which being disposed at top and bottom of the MEA is compressed from both directions of top and bottom at the time of assembly so that they can completely encompass the cross-sectional surfaces of the MEA.

In another aspect, the present invention provides a gasket comprising a support for reinforcing purpose and two rows of beads attached on top of the support.

In a further aspect, the present invention provides a gasket wherein only the support is inserted into the groove formed between each of the separator plates and the gasket at the time of assembly.

In a further aspect, the present invention provides a gasket wherein the two rows of beads in the gasket include space among the beads to absorb the amount of transformation being compressed.

In a further aspect, the present invention provides a gasket wherein the two rows of beads in the gasket include space among the beads to absorb the amount of transformation being compressed.

In a further aspect, the present invention provides a unit cell structure for fuel cell stack comprising a composite gasket, wherein each boundary of the two rows of beads respectively accords with the boundary of the support before the completion of the assembly (before the transformation).

In a further aspect, the present invention provides a unit cell structure for fuel cell stack comprising a composite gasket, wherein each boundary of the two rows of beads respectively accords with the boundary of the separator plate after the completion of the assembly (after the transformation).

In a further aspect, the present invention provides a unit cell structure for fuel cell stack comprising a composite gasket, wherein the support is selected from the group consisting of plastic film, texture and metal.

In a further aspect, the present invention provides a unit cell structure for fuel cell stack comprising a composite gasket, wherein the support of the gasket is provided with a release sheet processed with adhesive.

In a further aspect, the present invention provides a unit cell structure for fuel cell stack comprising a composite gasket, wherein the gasket is applied in an integrated body after being attached to the separator plates.

BRIEF DESCRIPTION OF THE DRAWINGS

The above and other objects and features of the present invention will become apparent from the following description of the invention, when taken in conjunction with the accompanying drawings, wherein.

DETAILED DESCRIPTION OF PREFERRED EMBODIMENTS

Hereinafter, preferred embodiments of the present invention are described in detail with reference to the accompanying drawings.

Figure 1:
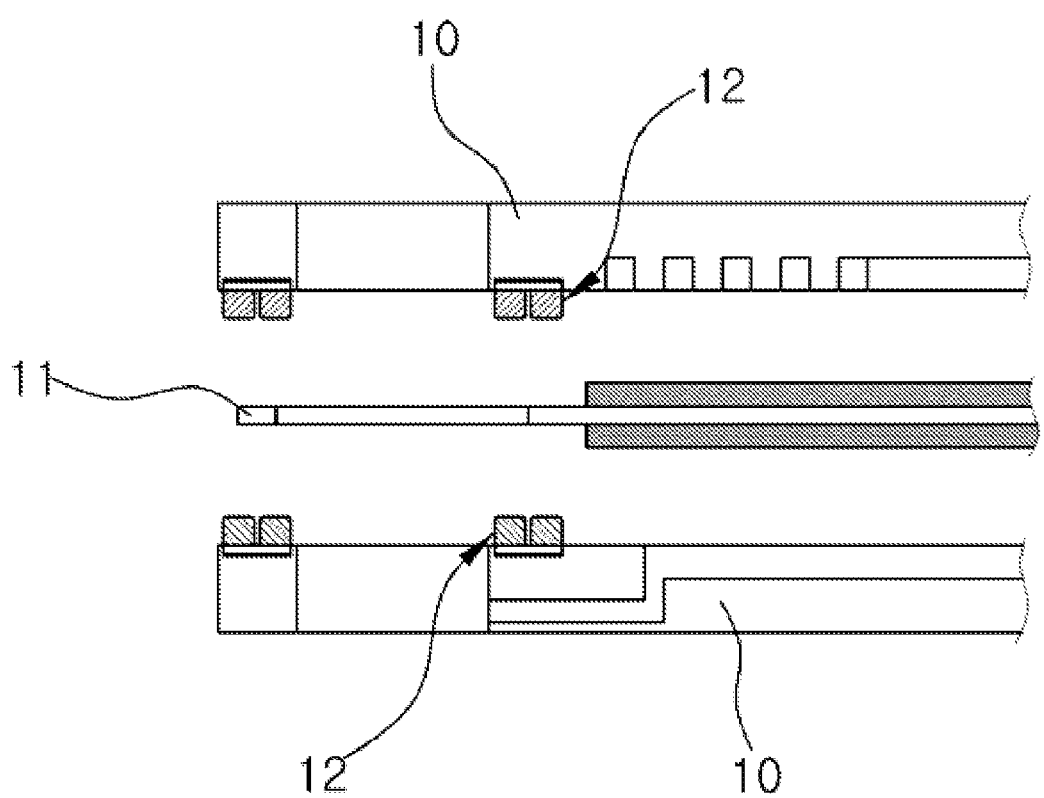
FIG. 1 is a cross-sectional view of the structure of a unit cell for fuel cell stack according to the present invention before its assembly.
Figure 2:
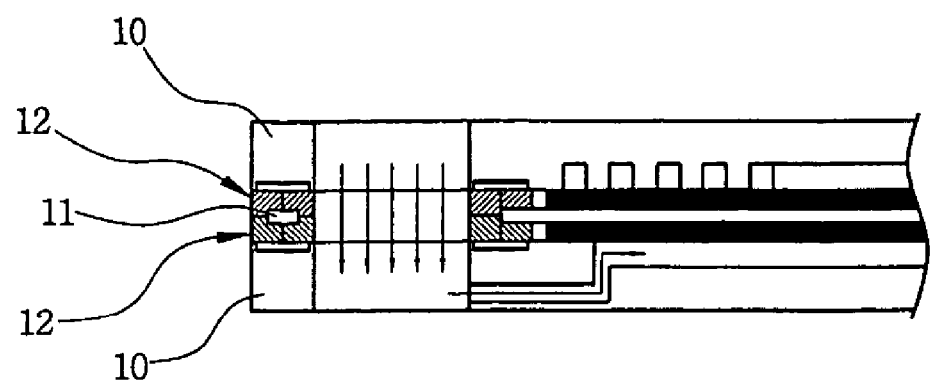
FIG. 2 is a cross-sectional view of the structure of a unit cell for fuel cell stack according to the present invention after its assembly.
Figure 3:
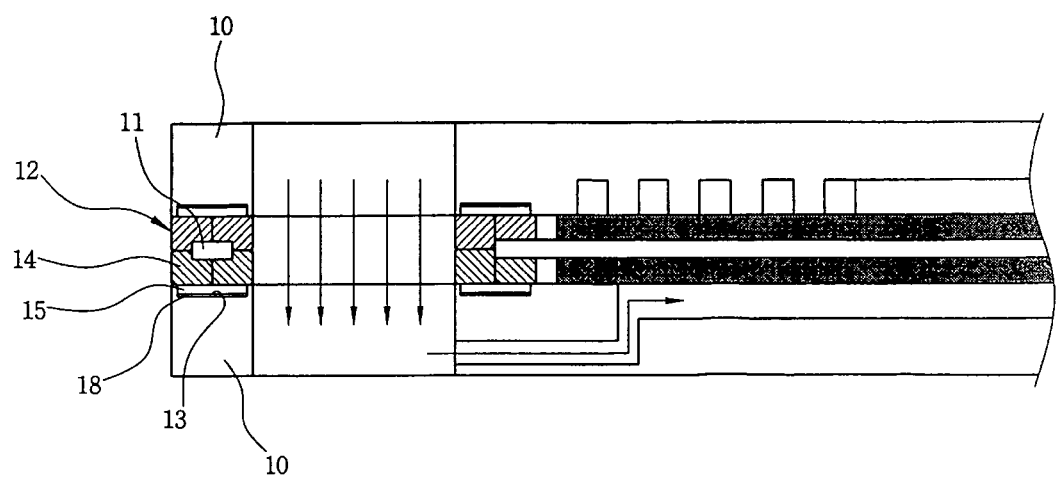
FIG. 3 is a partial exploded view of FIG. 2.

As shown in FIGS. 1-3, in the assembly of the separator plates 10 and MEA 11 along with the composite gasket 12, the boundaries of the separator plates 10, MEA 11 and the gasket 11 are aligned via the two rows of beads 14 of the gasket 12. That is, separator plates 10 are disposed on opposite sides of the MEA 11 wherein the gasket 12 is disposed in between each of separator plates 10 and the MEA 11. When the separator plates 10, the MEA 11 and the gasket 12 are integrated to be assembled, the two rows of beads 14 of the gasket 12 are finally compressed and outer beads of the two rows of beads 14 come to a position to fully encompass the MEA 11 thereby aligning their boundaries to that of the gasket 12. This was made possible because the position of the gasket 12 that is to be attached to the separators 10 was determined based on the calculation of the amount of transformation of the gasket in response to the assembly pressure thereby exhibiting a predetermined amount of transformation for a fixed assembly pressure. This also enables a uniform gas supply.

Figure 4:
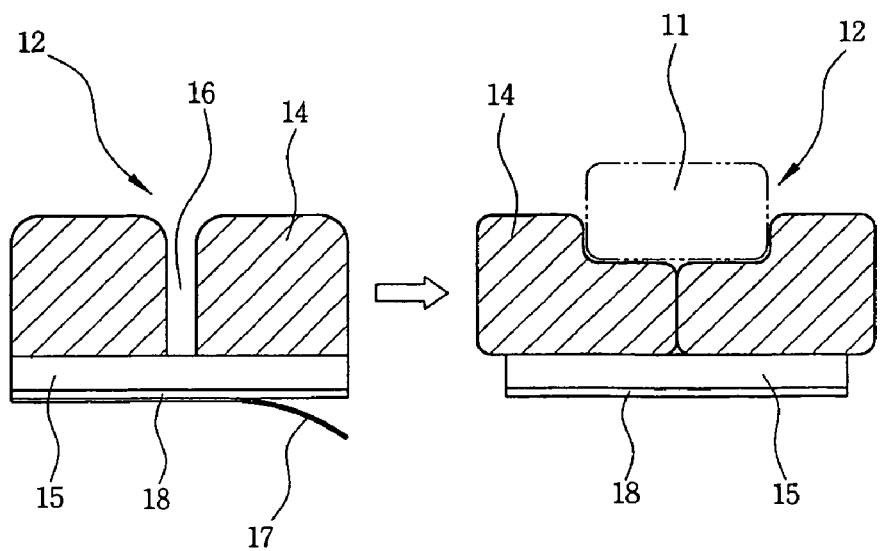
FIG. 4 shows cross-sectional views of the layered structure of the composite gasket in the structure of a unit cell for fuel cell stack according to the present invention and their state before and after the transformation.

In addition, embodiments of this invention provides two rows of beads unlike the conventional single row of beads provides a double sealing structure thus completely preventing the contamination of both the interior and exterior of the unit cell. Further embodiments provide a composite gasket where the separators 10 are assembled while they are being inserted into the groove 13 thus eliminating any unnecessary movement and promoting desirable surface pressure and sealing property. FIG. 4 shows cross-sectional views of the layered structure of the composite gasket in the structure of a unit cell for fuel cell stack of this invention and their state before and after the transformation. The above composite gasket can be prepared in the form of a support to which an adhesive is attached, for example, a plastic film where its surface is coated with rubber in a desired shape, to serve a gasket. Once coating is completed, the gasket is connected to the groove 13 which is prepared on the separators 10 after the back sheet 17 is removed. Here, only the support 15 excluding the tow rows of beads 14 are inserted into the groove 13.

Embodiments of this invention also provide an adhesive plastic film which remedies the disadvantageous property of rubber that cannot retain a fixed form. The plastic film is provided as a way to improve mountability in the course of assembly process and other materials such as textile and metals can be used as an alternative instead of the plastic film.

Considering the amount of transformation after compression, there is provided a certain space 16 between the two rows of beads made of rubber of this invention. The adhesive 18 was applied so that it cannot be decomposed after assembly and plastic film or paper can be used as the back sheet 17 for easy release. The two rows of beads 14 are transformed as they are compressed after assembly. Before transformation, the boundaries of beads are aligned with the boundary of the support 15, as shown on the left, whereas, after transformation, the beads are compressed as shown on the right where the bead boundaries are projected with respect to that of the support 15 and thus projected boundaries are aligned to the boundary of the separators 10. As shown in FIG. 3, the two rows of beads, in a state when the unit cell assembly is completed, are compressed by means of the two separators 10 located both top and bottom with respect to the cross-section of MEA 11 completely encompass the entire cross-sectional boundaries (four cross-sections) of the MEA 11. The internal cross-sections of the MEA 11, i.e., the cross-sections located on the right side of the drawing, which are encompassed by internal beads, are encompassed in only three cross-sections.

The unit cell structure, in particular the composite gasket of an embodiment of the invention, may be characterized in that the support as a reinforcing material is made of a plastic film. On one surface there is provided an adhesive while the opposite side is coated with rubber. The rubber-coated surface is in contact with MEA 11 while the other surface coated with an adhesive 18 is being attached to the groove 13 and they are assembled as an integrated body as such. Here, it is desirable that the adhesive plastic film and the rubber be maintained to have a low assembly pressure, not transformed at the operation temperature of 80-90° C., and also have a sufficient durability so that they do not become corrosive in the presence of a strong acid produced during chemical reactions and water. Examples of the plastic material used in this invention as a material for the plastic which does not shrink at a temperature of fuel cell atmosphere and during its course of manufacture, have durability in the presence of a strong acid and can be processed in the form of a thin plate, are engineering plastics with excellent heat resistance, chemical resistance and dimensional stability such as polyethylene terephthalate and polyimide. In addition, the support of the gasket can be made using textiles and metals.

The adhesive to be coated on the surface of the plastic film should be heat resistant so that it is not transformed by heat during the course of manufacturing the gasket. The proper selection and adjustment of the amount and the adhesive material is of importance because none of the components should be exposed once the installation is completed. An acrylic adhesive is an example of a suitable adhesive.

The support 15 is coated with rubber for the preparation of two rows of beads and a 'silk screen process' may be used. The silk screen process comprises spreading net screen comprising silk, nylon, tetron textile and stainless steel into a frame and securing the four corners of the frame tightly, covering up of all the eyes in the above net screen by forming a flat membrane by a manual or photochemical method except those required for image process. A prepared material is poured into the frame and pressure applied onto the inner side of the net screen using a spreading device such as a squeegee'. Material is passed through the net screen uncovered with the flat membrane thereby coating the material placed under the frame. The beads formed by the above silk screen process goes through with a hardening process at room temperature or a high temperature for a predetermined period of time and are finally made into a complete product. The silk screen process is advantageous in that it is a very simple process which can significantly reduce the loss of materials by appropriate control of the amount of supply and also has an excellent dimensional stability. For these reasons, the silk screen process may be preferred, due to its cost-effectiveness and relatively short manufacturing period of time, to other such methods as Compression Mold, MIPG (molded in place gasket) or FIPG (formed in place gasket). Such other methods may, however, be preferable in certain applications as may be determined by a person skilled in the art.

The silk screen process is in general applied with a thickness of 100 μm or less, but in embodiments of the present invention the process was applied with a thickness of 200-400 μm and thus required more restricted conditions regarding viscosity, solid fraction, and cross-sectional shape of liquid rubber, etc. For example, beads with the width of 1.5-2 mm were prepared by using liquid silicon or fluorine material which has a viscosity of about from 200 to 400 (poise) and 70% or more of solid content (non-volatiles).

Fluorine is highly durable against strong acids but when silicon is used as an alternative it is preferred to use an acidic silicon. Further, the rubber used in this invention has a Hs (hardness shoe A) of about from 20 to 30 in order to maintain the assembly pressure at a low level.

In addition, embodiments of the present invention improve the conventional one-rowed bead type to a two-rowed bead type in order to prevent a coolant from penetrating into an active area where an electrochemical reaction is performed between oxygen and hydrogen atoms in the separator plate. Thus prepared two-rowed bead type can be classified into internal beads and external beads with respect to the separator plate, where the internal beads disposed between the oxygen electrode and the hydrogen electrode become in contact with MEA, whereas the external beads become in contact among beads thereby providing a double sealing. In thus prepared double sealing rubber beads, the external beads can prevent the penetration of a coolant due to shrinkage/expansion because they are in contact with themselves thereby completely blocking the exterior of the MEA and stack. Therefore, the MEA is not influenced by external factors at all.

Further, the two-rowed beads of the present invention, which minimize the volume per each bead considering the effect of its volume on the functions of a fuel cell, are advantageous in that they are completely blocked from a unit cell (manifold) or external contamination.

Still further, the present invention enables the transformed amount of rubber, resulting from the compressed force at the time of assembly where the gasket is mounted on the separator plates via a given pressure, to become completely aligned to the external boundaries of the separator plates. Therefore, the reaction gas in the unit cell (manifold) is not prevented by the separator plates, a gasket or MEA but is sufficiently supplied thus preventing the possible deterioration in functions due to irregular supply.

Still further, this invention may provide a groove to serve it as a guide for perfectly aligning the contacting surfaces of a gasket which is connected to the separator plates disposed on both electrodes of MEA. The groove processed on the separator plates are formed with a depth of about from 0.05 to 0.1 mm and its precise location with respect to the external boundaries was determined based on calculation of the transformed amount of the rubber.

It will be clear to one of skill in the art that the present invention may be embodied in other forms, structures, arrangements, and proportions, and may use other elements, materials and components. The present disclosed embodiments are, therefore, to be considered in all respects as illustrative and not restrictive, the scope of the invention being indicated by the appended claims and not limited to the foregoing description.

What is claimed is:

1. A unit cell structure for a fuel cell stack comprising an MEA and a separator plate located on each side of the MEA, wherein said structure comprises:
    a composite gasket located between the MEA and each separator plate, each said gasket comprising:
    two rows of rubber beads, each row of which is disposed at a top and a bottom of the MEA and is compressed from both top and bottom directions during assembly so that outer ones of said beads completely encompass cross-sectional surfaces of the MEA; and
    a support for reinforcing, wherein said two rows of rubber beads are attached to and on top of the support;
    wherein only the support is inserted into a groove between said gasket and each of the separator plates.

2. The unit cell structure according to claim 1, wherein the support of said gasket is provided with a release sheet processed with adhesive.

3. The unit cell structure according to claim 1, wherein said gasket is applied in an integrated form after being attached to the separator plates.

* * * * *